(12) United States Patent
Jones et al.

(10) Patent No.: US 10,820,171 B2
(45) Date of Patent: Oct. 27, 2020

(54) SYSTEM AND METHOD FOR IDENTIFYING TRANSITION POINTS IN A RETAIL FACILITY

(71) Applicant: Walmart Apollo, LLC, Bentonville, AR (US)

(72) Inventors: Nicholaus A. Jones, Fayetteville, AR (US); Jeremy R. Tingler, Bentonville, AR (US); Alvin S. Taulbee, Springdale, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 31 days.

(21) Appl. No.: 16/168,691

(22) Filed: Oct. 23, 2018

(65) Prior Publication Data

US 2019/0124487 A1  Apr. 25, 2019

Related U.S. Application Data

(60) Provisional application No. 62/576,258, filed on Oct. 24, 2017.

(51) Int. Cl.
*G06Q 30/00* (2012.01)
*H04W 4/35* (2018.01)
(Continued)

(52) U.S. Cl.
CPC ......... *H04W 4/35* (2018.02); *G06K 7/10009* (2013.01); *G06K 7/10445* (2013.01); *G06K 19/07758* (2013.01); *G06Q 10/087* (2013.01)

(58) Field of Classification Search
CPC ......... G06K 19/07758; G06K 7/10009; G06K 7/10445; G06Q 10/087; H04W 4/021; H04W 4/029; H04W 4/35; H04W 4/80
See application file for complete search history.

(56) References Cited

U.S. PATENT DOCUMENTS

| | | |
|---|---|---|
| 6,883,710 B2 | 4/2005 | Chung |
| 7,667,602 B2 | 2/2010 | Ulrich |

(Continued)

OTHER PUBLICATIONS

"RFID for Asset Tracking and Inventory Management for Warehousing and Retail"; http://www.gaorfidassettracking.com/RFID_Asset_Tracking_Applications/RFID_Inventory_Management_Warehousing_Retail.php; printed Feb. 19, 2017; pp. 1-4.

(Continued)

*Primary Examiner* — Thien M Le
(74) *Attorney, Agent, or Firm* — Fitch, Even, Tabin & Flannery LLP

(57) ABSTRACT

In some embodiments, apparatuses and methods are provided herein useful to updating an inventory database. In some embodiments, a system for updating an inventory database comprises an array of RFID readers positioned at different locations about the retail facility, where the RFID readers are configured to read RFID tags associated with products, and a control circuit, the control circuit configured to receive, from one or more RFID readers, identifiers, wherein the identifiers are associated with the RFID tags, determine, based on the identifiers, a flow of RFID tags, identify, without reference to a structural map of the retail facility, a transition point from the stockroom to the sales floor, determine, based on an RFID read, that a product has passed through the transition point from the stockroom to the sales floor, and update the inventory database to indicate that the product is located on the sales floor.

21 Claims, 3 Drawing Sheets

(51) Int. Cl.
*G06Q 10/08* (2012.01)
*G06K 19/077* (2006.01)
*G06K 7/10* (2006.01)

(56) References Cited

U.S. PATENT DOCUMENTS

| | | | |
|---|---|---|---|
| 8,395,508 B2 | 3/2013 | Burnside | |
| 8,477,013 B2 | 7/2013 | Sarma | |
| 8,519,848 B2 | 8/2013 | Stern | |
| 2007/0239569 A1* | 10/2007 | Lucas | G06Q 10/08 705/28 |
| 2012/0109842 A1 | 5/2012 | Bhatt | |
| 2012/0286939 A1 | 11/2012 | Cote | |
| 2014/0313015 A1* | 10/2014 | Duron | G06K 7/0008 340/10.3 |
| 2015/0116088 A1* | 4/2015 | Bellows | G06K 7/0008 340/10.1 |
| 2015/0149352 A1* | 5/2015 | Nichols | G06Q 10/08 705/40 |
| 2015/0199890 A1 | 7/2015 | Hewett | |
| 2018/0189760 A1* | 7/2018 | Brooks | G06N 20/00 |
| 2019/0295061 A1* | 9/2019 | Brooks | G06Q 10/0875 |
| 2019/0325173 A1* | 10/2019 | Tingler | G01S 5/0294 |
| 2019/0325385 A1* | 10/2019 | Tingler | G06K 7/10297 |

OTHER PUBLICATIONS

Makelainen, J.; "In what store processes will you benefit the most from RFID technology?"; http://www.rfidarena.com/2014/2/27/inwhatstoreprocesseswillyoubenefitthemostfromrfidtechnology.aspx; published Feb. 27, 2014; pp. 1-5.

PCT; App. No. PCT/US2018/056618; International Search Report and Written Opinion dated Jan. 3, 2019.

Swedberg, C.; "American Apparel Deploys RealTime, Storewide RFID InventoryManagement Solution"; http://www.rfidjournal.com/articles/view?10906; published Aug. 13, 2013; pp. 1-2.

Yu, K et al. "Implementation of an RFID-Based Virtual Signal Mechanism for an Indoor Location Sensing System"; Journal of Internet Technology, vol. 14, No. 4; https://pdfs.semanticscholar.org/81ed/dce5b340942092dc3cca07c853b5e7b08cb4.pdf; Jul. 1, 2013; p. 1-24.

* cited by examiner

SYSTEM AND METHOD FOR IDENTIFYING TRANSITION POINTS IN A RETAIL FACILITY

CROSS-REFERENCE TO RELATED APPLICATION

This application claims the benefit of U.S. Provisional Application No. 62/576,258, filed Oct. 24, 2017, which is incorporated by reference in its entirety herein.

TECHNICAL FIELD

This invention relates generally to radio frequency identification (RFID) technology and, more particularly, to RFID technology in retail environments.

BACKGROUND

For retailers, inventory management is important to running a successful business. It is important to know what types of products and the quantity of products that are on hand. Additionally, it is important to know whether products are on the sales floor or in the stockroom. Many retailers utilize RFID readers to track product movement and determine whether products are on the sales floor or in the stockroom. Typically, these RFID readers are located at transition points, such as doors from the stockroom to the sales floor. However, these RFID systems are fixed and do not adapt well to floorplan changes. Consequently, a need exists for systems that can accurately determine product location as well as adapt to changing floorplans.

BRIEF DESCRIPTION OF THE DRAWINGS

Disclosed herein are embodiments of systems, apparatuses and methods pertaining to updating an inventory database as products move from a stockroom to a sales floor of a retail facility. This description includes drawings, wherein.

Figure 1:
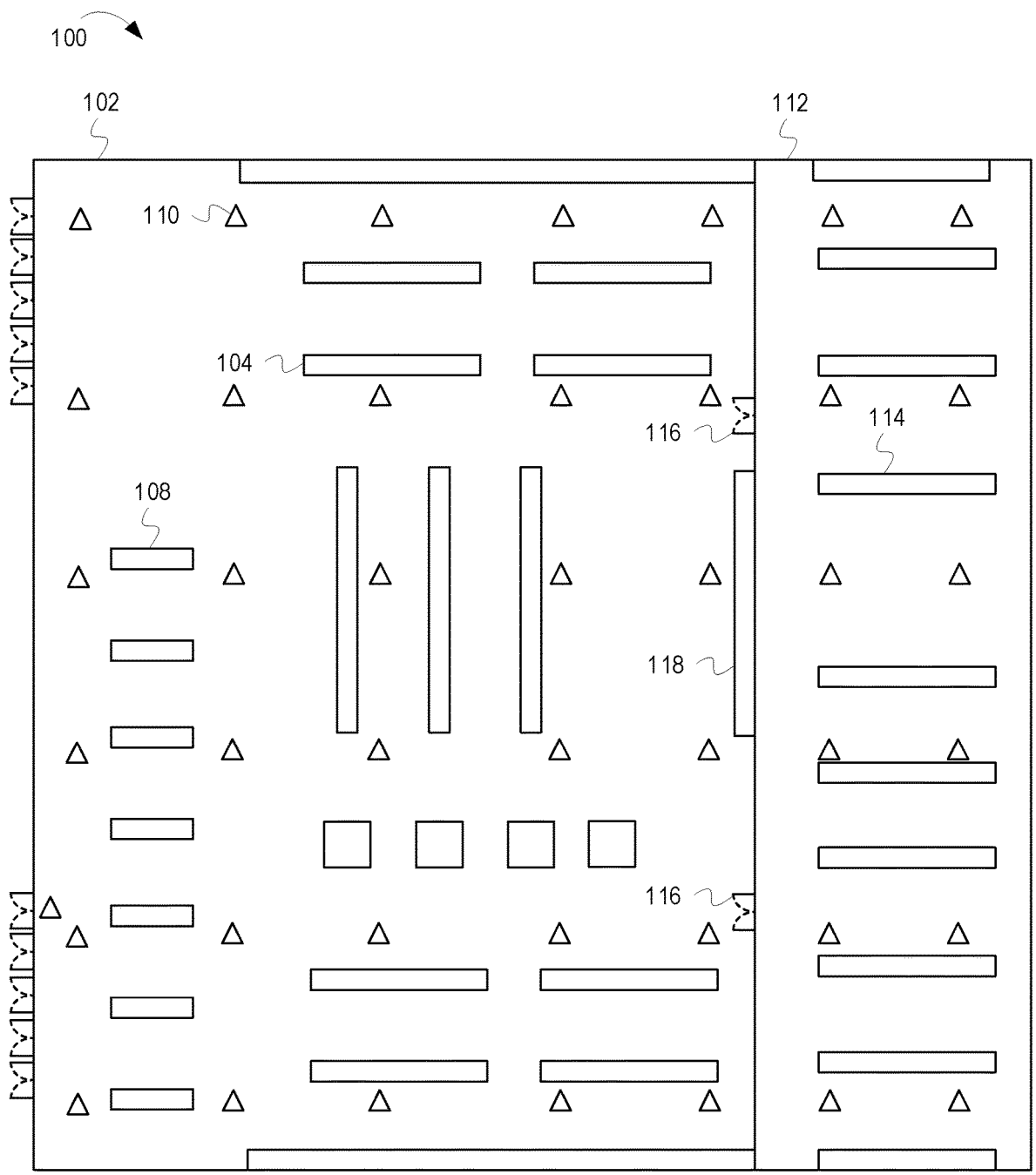
FIG. 1 is a diagram of a retail facility 100 including a system for monitoring products as the products pass through transition points, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to updating an inventory database as products move from a stockroom to a sales floor of a retail facility. In some embodiments, a system for updating an inventory database as products move from a stockroom to a sales floor of a retail facility comprises an array of RFID readers positioned at different locations about the retail facility, where the RFID readers are configured to read RFID tags associated with products, and wherein the array of RFID readers spans at least portions of the stockroom and the sales floor, and a control circuit communicatively coupled to the RFID readers, the control circuit configured to receive, from one or more RFID readers of the array of RFID readers, identifiers, wherein the identifiers are associated with the RFID tags, determine, based on the identifiers, a flow of RFID tags, identify, based on the flow of RFID tags and without reference to a structural map of the retail facility, a transition point from the stockroom to the sales floor, determine, based on an RFID read, that a product has passed through the transition point from the stockroom to the sales floor, and update the inventory database to indicate that the product is located on the sales floor.

As previously discussed, inventory management is important for retailers. Typically, retailers utilize a system of RFID readers to track RFID tags associated with products. These RFID readers are placed near transition points (e.g., passageways from a stockroom to sales floor). When an RFID tag passes the RFID reader, the RFID reader reads the RFID tag. Based on the RFID tag passing the RFID reader, it can be inferred that the product has crossed the transition point. While this system works fairly well, it is not adaptable to changes. Specifically, because the RFID readers are placed near transition points, if a transition point moves, or a transition point is added, an RFID reader will need to be moved, or added. Moving existing RFID readers and adding new RFID readers can be both costly and time-consuming. Additionally, because the RFID readers are placed near transition points, the RFID readers are single purpose (i.e., monitoring the transition point).

Embodiments of the inventive subject matter seek to eliminate, or at least minimize, these problems by leveraging existing infrastructure to monitor the movement of products in a retail facility. In one embodiment, the system includes a grid of RFID readers. The system identifies, based on the flow of RFID tags, transition points in the retail facility. The transition points can be physical transition points (e.g., doorways or passageways) and/or virtual transition points (e.g., boundaries of sections or departments). Once transition points are identified, the system can track products as they move through the transition points. Additionally, in some embodiments, the system can update an inventory database when a product crosses a transition point. For example, the system can update an inventory database to indicate that the product has crossed the transition point (e.g., that a product is on the sales floor after it passes through a transition point from the stockroom to the sales floor). The discussion of FIG. 1 provides an overview of such a system.

FIG. 1 is a diagram of a retail facility 100 including a system for monitoring products as the products pass through transition points, according to some embodiments. The system includes an array of RFID readers 110. The retail facility 100 includes a sales floor 102 and a stockroom 112. The array of RFID readers 110 spans both the sales floor 102 and the stockroom 112 (i.e., there are RFID readers 110 on the sales floor 102 and in the stockroom 112. In some embodiments, the RFID readers 110 are part of the existing infrastructure of the retail facility 100 (e.g., the RFID readers 110 may already be in use for tasks other than monitoring the movement of products through transition points).

The sales floor 102 includes a plurality of product display units 104 and point-of-sale (POS) terminals 108. The stockroom 112 includes a plurality of shelving units 114 to hold products. Additionally, the retail facility 100 includes two transition points, depicted as doors 116. The doors 116 allow passage from the stockroom 112 to the sales floor 102, and vice versa. Although the transition points depicted in FIG. 1 are between the stockroom 112 and the sales floor 102, in some embodiments, additional and/or other locations can be transition points. For example, a boundary between two departments, an aisle and a department, etc. can be transition points.

Because the doors 116 are the transition points, the system monitors products as they move between the sales floor 102 and the stockroom 112. When the RFID readers 110 read RFID tags, the RFID tags transmit identifiers to the RFID readers 110. The identifiers can identify the RFID tag (e.g., a serial number for the RFID tag), generally identify a product with which the RFID tag is associated (e.g., a type, brand, style, manufacturer, cost, etc. of a product), and/or uniquely identify the product (e.g., via a serial number). In some embodiments, the system identifies the transition points (i.e., the doors 116) based on the flow of RFID tags. For example, the type of products, quantity of products, variety of products, percentage of products, timing of movement of products, etc. in the flow of RFID tags is used to identify the transition points. That is, the flow of RFID tags through the doors 116 will likely differ from the flow of RFID tags generally in the retail facility 100. For example, during restocking, twenty-five televisions may pass through the doors 116. Because it is unlikely that a customer is transporting twenty-five televisions in the retail facility 100, it is likely that this location is a transition point. As another example, twenty bottles of shampoo, fifteen boxes of cereal, eight pair of jeans, and four crates of bananas may pass through the doors 116. Because it is unlikely that a customer has this variety, and quantity, of items in his or her cart, the location is likely a transition point. The system can determine locations of the RFID tags (and thus the transition points) based on a received signal strength indicator (RSSI) value (i.e., the signal strength of the RFID tags indicated how close the RFID tag is to the RFID readers 110), an angle of arrival (i.e., the angle at which the RFID tags enter the thresholds indicate a relative position as they enter the thresholds), read rate (i.e., how often the RFID tags are able to be read indicates a distance from the RFID tag to the RFID readers 110), or any other suitable metrics.

In some embodiments, in addition to identifying transition points, the system can update an inventory database with indications of product locations and/or product movements. As depicted in FIG. 1, the doors 116 are transition points between the sales floor 102 and the stockroom 112. In this example, the system can update an inventory database to indicate that a product is in the stockroom 112, or on the sales floor 102 as appropriate, when a product passes through a transition point. This may be particularly helpful for products that are located on product display unit 104 or shelving units 114 that are near a boundary between the stockroom 112 and the sales floor 102 (or any other boundary), such as the rearmost product display unit 118. Products located on the rearmost product display unit 118 are close enough to the stockroom 112 that RFID tags associated with these products may be mistaken, based on RFID reads, as being in the stockroom 112. In embodiments in which the system updates an inventory database to indicate locations of products, this problem can be minimized, if not eliminated, by updating the inventory database as the product passes through the door 116.

Figure 2:
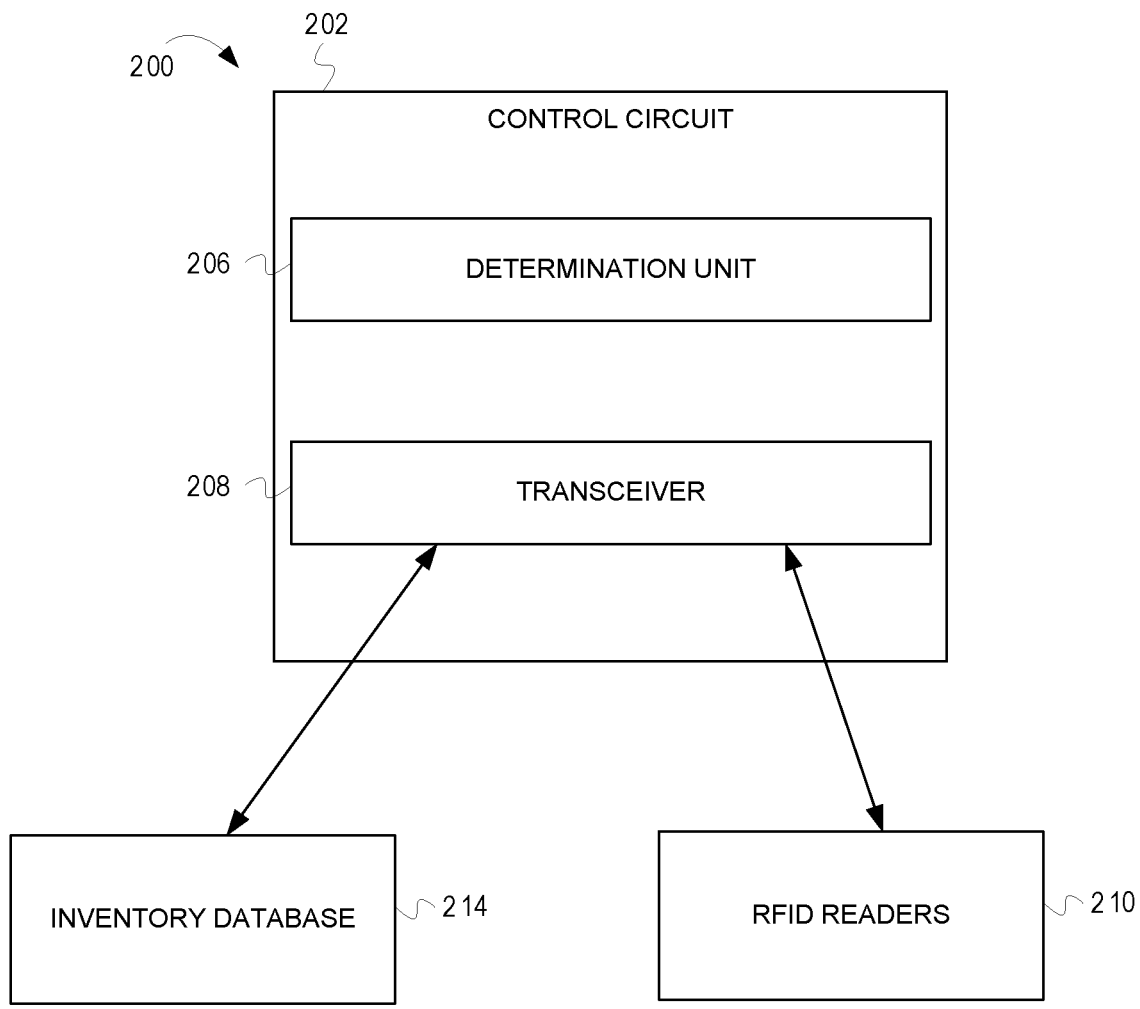
FIG. 2 is a block diagram of a system 200 for updating an inventory database as products move from a stockroom to a sales floor of a retail facility, according to some embodiments.

While the discussion of FIG. 1 provides an overview of a retail facility including a system for updating an inventory database as products move from a stockroom to a sales floor, the discussion of FIG. 2 provides additional details regarding such a system.

FIG. 2 is a block diagram of a system 200 for updating an inventory database as products move from a stockroom to a sales floor of a retail facility, according to some embodiments. The system 200 includes a control circuit 202, an inventory database 214, and RFID readers 210. The RFID readers 210 are located in a retail facility. For example, the RFID readers 210 can be located about a stockroom and a sales floor of the retail facility. The retail facility can include any suitable number, type, and arrangement of RFID readers 210. In some embodiments, the RFID readers 210 are arranged in an array with approximately ten to twenty meter intervals. The RFID readers read RFID tags associated with products. When an RFID reader 210 reads an RFID tag, the RFID reader 210 receives an identifier from the RFID tag. The RFID reader 210 are communicatively coupled to the control circuit 202 (e.g., directly and/or indirectly via a network). The RFID readers 210 transmit the identifiers to the control circuit 202.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit includes a transceiver 208 (or in some embodiments, a separate receiver and transmitter) and a determination unit 206. The transceiver 208 receives identifiers from the RFID readers 210. The determination unit 206 analyzes the received identifiers to determine a flow of RFID tags. The determination unit 206 identifies a transition point based on the flow of the RFID tags. The transition point can be a physical transition point (e.g., a door, movable barrier, hallway, passageway, etc.) or a virtual transition point (i.e., a transition point that may not be marked by a physical structure or passageway). In some embodiments, the flow of RFID tags indicates a transition point because the flow of RFID tags differs from a normal flow of RFID tags (e.g., an expected movement of RFID tags based on customers traversing the retail facility). Alternatively, or additionally, the flow of RFID tags can indicate a transition point based on normal customer traffic with specific items or types of items (e.g., a transition point leaving an electronic department can be identified based on the concentration of electronic passing an area).

Additionally, in some embodiments, the control circuit 202 can update the inventory database 214 to indicate movement of the product (e.g., that the product has moved and/or a location of the product). For example, the transceiver 208 can transmit this indication to the inventory database 214. The inventory database can be local to, or remote from, the control circuit 202 and/or the retail facility. For example, the transceiver 208 can transmit the indication to the inventory database over a local or wide area network (e.g., the Internet). The inventory database 214 includes indications of products, such as locations of products. The retailer can access the inventory database to determine where products are, as well as total number of products on hand, in the stock room, on the sales floor, in transit, ordered, etc.

Figure 3:
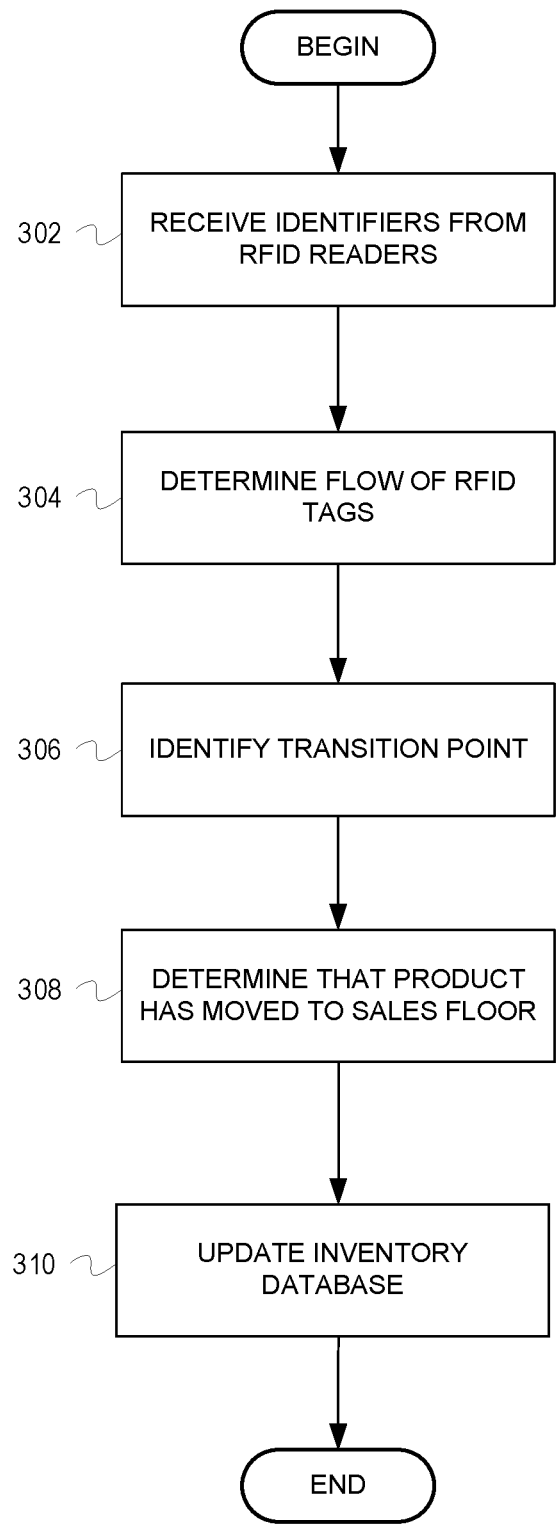
FIG. 3 is a flow chart depicting example operations for updating an inventory database as products move from a stockroom to a sales floor of a retail facility, according to some embodiments.

While the discussion of FIG. 2 provides additional details regarding a system for updating an inventory database, the discussion of FIG. 3 describes example operations for updating an inventory database.

FIG. 3 is a flow chart depicting example operations for updating an inventory database as products move from a stockroom to a sales floor of a retail facility, according to some embodiments. The flow begins at block 302.

At block 302, identifiers are received from RFID readers. For example, a control circuit can receive the identifiers from the RFID readers. When an RFID reader reads an RFID tag, the RFID tag transmits an identifier to the RFID reader. The RFID tags are associated with products. The identifiers can identify the RFID tag and/or the product. For example, the identifier can identify a type of product, style of product, model of product, manufacture of product, etc. The flow continues at block 304.

At block 304, a flow of RFID tags is determined. For example, the control circuit can determine the flow of RFID tags. The flow of RFID tags can include the quantity of RFID tags, information about a product associated with the RFID tags, a frequency with which the RFID tags pass a location, a time at which the RFID tags pass a location, etc. For example, the flow of RFID tags might show that a certain variety and quantity or volume of products passes a location during hours in which the retail facility is closed. The flow continues at block 306.

At block 306, a transition point is identified. For example, the control circuit can identify the transition point. In some embodiments, the control circuit identifies the transition point based on the flow of RFID tags. For example, as described above, the flow of RFID tags might show that a certain variety and quantity of products passes a location during hours in which the retail facility is closed. Based on the quantity and variety of products, as well as the timing of the movement of the products, the control circuit may be able to identify the location as a transition point. In addition to determining that a location is a transition point, when the control circuit identifies the transition point it identifies the location. The control circuit can determine the location of the transition point based on RSSI values, frequency of RFID reads, the identity and/or location of RFID readers reading the RFID tags, etc. Because the system is capable of identifying transition points, the system is adaptable to changing conditions in the retail facility. For example, if an additional door is added, a door is removed, or an object is added to the retail facility that obscures RFID reads, the system can adapt. Specifically, the system can adapt by identifying new and/or altered transition points. The flow continues at block 308.

At block 308, it is determined that a product has moved to the sales floor. For example, the control circuit can determine that the product has moved to the sales floor. In some embodiments, the transition points are locations at which products can move between the stockroom and the sales floor. For example, the transition points can be doors between the stockroom and the sales floor. If the transition point is a point at which products can move between the stockroom and the sales floor, when a product crosses the transition point, the product has moved between the stockroom and the sales floor. In some embodiments, the system can also determine in which direction the product is moving. For example, if after crossing the transition point an RFID reader on the sales floor reads an RFID associated a product, that product has moved from the stockroom to the sales floor. Additionally, or alternatively, the system can determine a direction of travel for the product based on an angle of arrival of the identifier from the RFID tag. The flow continues at block 310.

At block 310, an inventory database is updated. For example, the control circuit can update the inventory database. The inventory database includes information about products in inventory. For example, the inventory database can include quantities of products in inventory as well as location of products. The location of the product can be specific (e.g., a row, aisle, shelf, etc.) or more general (e.g., an area of the retail facility (e.g., a department, stockroom, sales floor, etc.), an indication of a retail facility, an indication of a geographic region, that the product is in transit, etc.). Continuing the example provided above, if the transition point is from the stockroom to the sales floor, the inventory database can be updated to indicate that the product has, for example, moved from the stockroom to the sales floor.

Generally speaking, pursuant to various embodiments, systems, apparatuses and methods are provided herein useful to updating an inventory database as products move from a stockroom to a sales floor of a retail facility. In some embodiments, a system for updating an inventory database as products move from a stockroom to a sales floor of a retail facility comprises an array of RFID readers positioned at different locations about the retail facility, where the RFID readers are configured to read RFID tags associated with products, and wherein the array of RFID readers spans at least portions of the stockroom and the sales floor, and a control circuit communicatively coupled to the RFID readers, the control circuit configured to receive, from one or more RFID readers of the array of RFID readers, identifiers, wherein the identifiers are associated with the RFID tags, determine, based on the identifiers, a flow of RFID tags, identify, based on the flow of RFID tags and without reference to a structural map of the retail facility, a transition point from the stockroom to the sales floor, determine, based on an RFID read, that a product has passed through the transition point from the stockroom to the sales floor, and update the inventory database to indicate that the product is located on the sales floor.

In some embodiments, an apparatus and a corresponding method performed by the apparatus comprises receiving, from one or more RFID readers in an array of RFID readers positioned at different locations about a retail facility, identifiers, wherein the identifiers are associated with RFID tags, wherein the array of RFID readers is positioned about the retail facility, and wherein the RFID readers are configured to read RFID tags associated with the products, determining, based on the identifiers, a flow of RFID tags, identifying, based on the flow of RFID tags and without reference to a structural map of the retail facility, a transition point from the stockroom to the sales floor, determining based on an RFID read, that a product has passed through the transition point from the stockroom to the sales floor, and updating the inventory database to indicate that the product is located on the sales floor.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for updating an inventory database as products move from a stockroom to a sales floor of a retail facility, the system comprising:
   an array of RFID readers positioned at different locations about the retail facility, wherein the array of RFID readers is configured to read RFID tags associated with products, and wherein the array of RFID readers spans at least portions of the stockroom and the sales floor; and
   a control circuit communicatively coupled to the array of RFID readers, the control circuit configured to:
      receive, from one or more RFID readers of the array of RFID readers, identifiers, wherein the identifiers are associated with the RFID tags;
      determine, based on the identifiers, a flow of RFID tags;
      identify, based on the flow of RFID tags and without reference to a structural map of the retail facility, a transition point from the stockroom to the sales floor;
      determine, based on an RFID read, that a product has passed through the transition point from the stockroom to the sales floor; and
      update the inventory database to indicate that the product is located on the sales floor.

2. The system of claim 1, wherein the transition point is identified based on one or more of types of products, a volume of products, a variety of products, and a quantity of items.

3. The system of claim 1, wherein the transition point is located between two or more RFID readers in the array of RFID readers.

4. The system of claim 1, wherein the transition point is associated with a physical passageway.

5. The system of claim 1, wherein the transition point is not associated with a physical passageway.

6. The system of claim 1, wherein the determination that the product has passed through the transition point is based on one or more of a received signal strength indicator (RSSI) value, an angle of arrival, a read rate, and an identifier of an RFID reader.

7. The system of claim 1, wherein the control circuit is further configured to:
   determine a location of the product; and
   update the inventory database to include the location of the product.

8. The system of claim 1, wherein RFID readers in the array of RFID readers are placed at ten to twenty meter intervals.

9. The system of claim 1, wherein the control circuit is further configured to:
   determine, based on the flow of RFID tags, that the flow of RFID tags differs from a normal flow of RFID tags in the retail facility;
   wherein the identification of the transition point from the stockroom to the sales floor is based on the flow of RFID tags differing from the normal flow of RFID tags in the retail facility.

10. The system of claim 9, wherein the normal flow of RFID tags is based on an expected movement of RFID tags based on customers traversing the retail facility.

11. A method for updating an inventory database as products move from a stockroom to a sales floor of a retail facility, the method comprising:
   receiving, from one or more RFID readers in an array of RFID readers positioned at different locations about the retail facility, identifiers, wherein the identifiers are associated with RFID tags, wherein the array of RFID readers is positioned about the retail facility, and wherein the one or more RFID readers are configured to read RFID tags associated with the products;
   determining, based on the identifiers, a flow of RFID tags;
   identifying, based on the flow of RFID tags and without reference to a structural map of the retail facility, a transition point from the stockroom to the sales floor;
   determining, based on an RFID read, that a product has passed through the transition point from the stockroom to the sales floor; and
   updating the inventory database to indicate that the product is located on the sales floor.

12. The method of claim 11, wherein the transition point is identified based on one or more of types of products, a volume of products, a variety of products, and a quantity of items.

13. The method of claim 11, wherein the transition point is located between two or more RFID readers in the array of RFID readers.

14. The method of claim 11, wherein the transition point is associated with a physical passageway.

15. The method of claim 11, wherein the transition point is not associated with a physical passageway.

16. The method of claim 11, wherein the determination that the product has passed through the transition point is based on one or more of a received signal strength indicator (RSSI) value, an angle of arrival, a read rate, and an identifier of an RFID reader.

17. The method of claim 11, further comprising:
   determining a location of the product; and
   updating the inventory database to include the location of the product.

18. The method of claim 11, wherein the RFID readers in the array of RFID readers are placed at ten to twenty meter intervals.

19. The method of claim 11, wherein the array of RFID readers spans at least portions of the stockroom and the sales floor.

20. The method of claim 11, further comprising:
   determining, based on the flow of RFID tags, that the flow of RFID tags differs from a normal flow of RFID tags in the retail facility;
   wherein the identifying the transition point from the stockroom to the sales floor is based on the flow of RFID tags differing from the normal flow of RFID tags in the retail facility.

21. The method of claim 20, wherein the normal flow of RFID tags is based on an expected movement of RFID tags based on customers traversing the retail facility.

* * * * *